United States Patent [19]
Harding et al.

[11] 3,902,004
[45] Aug. 26, 1975

[54] CLIPS

[75] Inventors: John Patrick Harding, Bushey; David Sydney Butler, Hassocks; Frank James Lee, Devon, all of England

[73] Assignee: The Post Office, London, England

[22] Filed: Jan. 7, 1974

[21] Appl. No.: 431,372

Related U.S. Application Data

[62] Division of Ser. No. 216,410, Jan. 10, 1972, Pat. No. 3,798,347.

[30] Foreign Application Priority Data
Jan. 11, 1971    United Kingdom............... 1192/71

[52] U.S. Cl.............................. 174/84 C; 339/98
[51] Int. Cl.² ....................................... H02G 15/08
[58] Field of Search ................. 174/84 C, 90, 94 R; 339/97 C, 98, 276 R, 276 T; 29/628, 630 A, 630 F

[56] References Cited
UNITED STATES PATENTS

| | | | |
|---|---|---|---|
| 3,303,266 | 2/1967 | Thompson | 174/84 C |
| 3,514,528 | 5/1970 | Ray | 174/84 C |
| 3,517,804 | 6/1970 | Faulkner | 174/84 C X |
| 3,553,347 | 1/1971 | Harding et al. | 174/84 C |
| 3,621,117 | 11/1971 | Antas et al. | 174/84 C |
| 3,662,089 | 5/1972 | Harding | 174/84 C |
| 3,798,347 | 3/1974 | Harding et al. | 174/84 C |

*Primary Examiner*—Darrell L. Clay
*Attorney, Agent, or Firm*—Hall & Houghton

[57] ABSTRACT

A crimping clip for jointing individual conductors in a multi-conductor cable has tangs formed in areas of the clip over which the thickness is reduced as compared with other areas. Alternatively, the tangs are formed in a liner placed inside the clip and whose thickness is less than that of the clip.

11 Claims, 16 Drawing Figures

3,902,004

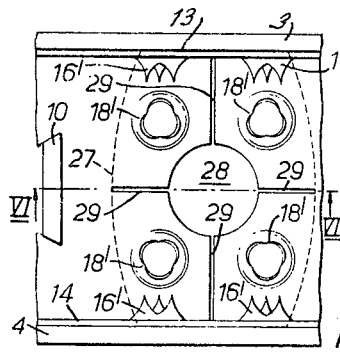
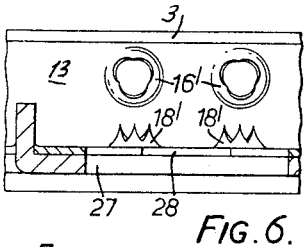
FIG. 5.
FIG. 6.
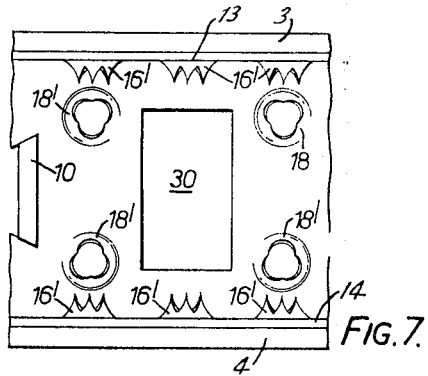
FIG. 7.

CLIPS

This is a division of application Ser. No. 216,410, filed Jan. 10, 1972, now U.S. Pat. No. 3,798,347, issued Mar. 19, 1974.

BACKGROUND OF THE INVENTION

This invention relates to clips, and has particular, but not exclusive, reference to clips used for jointing individual and corresponding wires of multiconductor cables used in the telecommunications industry.

In the past, the separate wires of adjoining lengths of, for example, telephone cables have been manually jointed by twisting two wires together to form a joint and covering the twisted joint with an insulating sleeve. Metallic crimping clips have recently been disclosed for use in conjunction with jointing machines to provide improved joints, both electrically and mechanically, over such manual joints.

While such crimping clips are generally satisfactory when used to joint copper wires, they are less satisfactory when used to joint aluminium wires because of factors, for example creep and oxide formation which occurs with aluminium wires. To ensure good connection to an aluminium wire, the oxide film which forms on its surface must be removed or penetrated and once electrical contact has been made re-oxidation at the point of contact must be prevented as far as possible.

SUMMARY OF THE INVENTION

The present invention envisages in a clip including a metallic initially open-ended, open-trough-shaped member comprising a base and two upstanding walls, the provision of tangs in the base and/or the walls, the tangs being formed in areas of the base and/or the walls which are thinner than the remainder of the base or walls.

Alternatively, the tangs may be formed only in a liner for the member, the liner has a base and walls and the thickness of the base of the liner being less than that of the member, and the thickness of the walls of liner is less than that of the walls of the member.

The whole of the liner may be thinner than the given thickness. The clip may include an outer coating of an insulating material, which may be of plastics material.

The base and walls may be locally reduced in thickness, and the tangs may be formed in such areas. Alternatively, the walls or the base may be provided with an extension of reduced thickness, the extension having the tangs, and being bent into operative position in the trough, so that, in the operative position, the tangs point inwardly.

The base of the trough-shaped member may be formed with at least two upstanding members in longitudinal alignment at each end, the said upstanding members being struck up from the base to be substantially perpendicular to the plane of the base, the liner being engageable with the portions.

The portions may be notched, and the liner may be formed with slots engageable with and smaller than the portions, the liner being forced on to the portions to be gripped thereby, and to retain the liner in the trough-shaped member.

The base may be slit so that some at least of the tangs are movable independently of the surrounding tangs in a plane perpendicular to the plane of the base.

The liner may be apertured in the centre and the base may have a corresponding aperture. The base may have an inwardly facing longitudinal hump, the liner in the uncrimped clip position forming two longitudinal air gaps, one on either side of the hump. The liner may be flat-bottomed, or may have a pair of longitudinally extending humps over the air gaps. The tangs may be positioned over the air gap.

The base may be provided with one or more apertures, the inner liner may extend over the apertures, and there may be tangs in that portion of the liner over the apertures.

The liner may have a central aperture and apertures in the walls, tongues from the central aperture in the base may be struck up to lie adjacent to the wall of the member in the apertures in the walls of the liner. The walls of the trough-shaped member may be embossed at the back of the tongues.

DESCRIPTION OF THE DRAWINGS

FIG. 5 is a plan view of an alternative centre of a clip,

FIG. 6 is a cross-section along the line VI—VI of FIG. 5,

FIG. 7 is a plan view of a further alternative centre of a clip,

DESCRIPTION OF PREFERRED EMBODIMENTS

Figure 1:
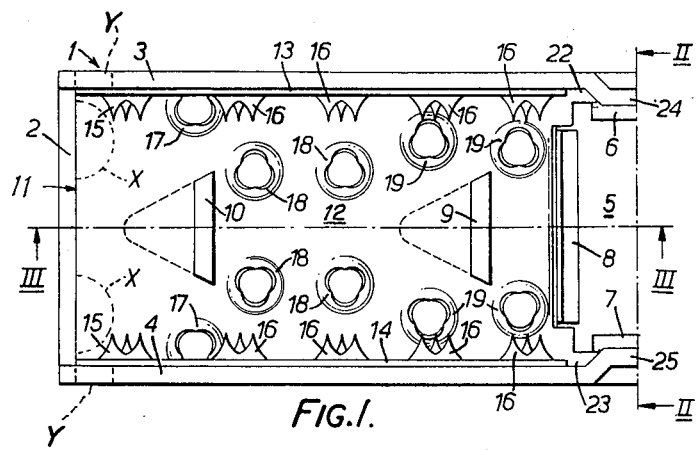
FIG. 1 is a plan view of a half of one embodiment of the invention.
Figure 3:
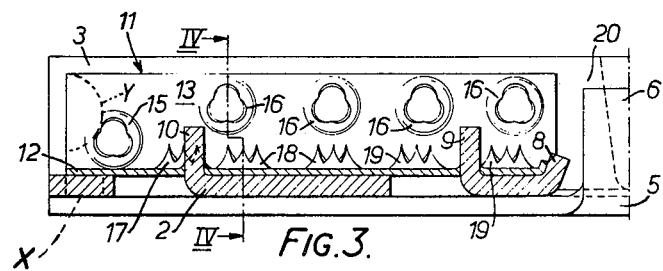
FIG. 3 is a cross-section along the line III—III of FIG. 1.
Figure 2:
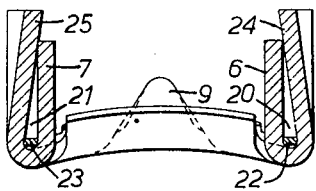
FIG. 2 is a cross-section along the line II—II of FIG. 1.
Figure 4:
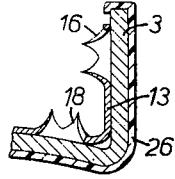
FIG. 4 is a cross-section along the line IV—IV of FIG. 3.

FIGS. 1 to 4 illustrate the left-hand half of a first form of crimping clip. The other half is a mirror image of the half illustrated. The clip comprises an outer member 1 of metal and of open-trough form with a substantially U-shaped cross-section. The member 1 has a base 2 and two upstanding walls 3, 4. From the base 2, two tongues 6, 7 are struck up to leave a central rectangular aperture 5. The edges of the aperture 5 perpendicular to the side walls 3, 4 are bent up to form lips, one of which is shown at 8, the lips being resiliently cantilevered from the remainder of the base. Also struck up from the base 2 are two pairs of approximately triangular portions, of which one pair, comprising portions 9, 10, is shown and whose function will be set out in detail below.

Located in the member 1 is an inner liner indicated generally at 11. The liner is also of metal and of open-trough-shaped form, having a base 12 and two upstanding walls 13, 14. As illustrated, the liner is slightly shorter in length than, and with walls not as high as, the member 1, and fits inside the latter leaving a small margin around the edges.

The inner liner is pierced to form a series of pairs of tangs, those shown in FIG. 1 being referenced 15 to 19 (tangs in like positions being given like reference numerals). The liner has a central aperture coincident with the aperture 5. A pair of slits is formed on either side to coincide with the portions 9 and 10, the liner being forced into the trough so that the portions extend through the slits to locate the liner. The slits are slightly smaller than the portions, and hence the liner is distorted as it is pushed into the clip, and, consequently, the liner is held by the portions. The inner liner is formed from tin-coated phosphor bronze and has a thickness approximately one-half that of the trough. An inner liner thickness of from 3–5 mils has been found satisfactory for use with aluminium wires of 0.020 in. diameter and which are polythene insulated.

The tangs are arranged in the clip so that they engage the wires which are crimped by the clip. The tangs 18 in the base are staggered from the tangs 19 and 17, and similarly the tangs 15 in the walls are staggered from the tangs 16. This staggering ensures that electrical contact is made with the wire wherever it lies in the tanged area. The triangular portions 9 and 10 also have an auxiliary function in this respect, in that they so position the wires in the clip that the wires lie in a tanged area ready for cripping.

The inner liner also has a pair of cut-outs 20 and 21 in the walls adjacent the central cut-out to accommodate the tongues 6, 7. Two "bridges" 22 and 23 are left to join together the two parts of the liner separated by the cut-outs 20 and 21 and the central aperture mentioned above. To form the inner liner, it is first bent to shape, and then the cut-outs are formed. The side and base are pierced to form the tangs and also the slits. The liner 11 is then pushed into the member 1 and is held by the portions 9 and 10. The member 1, which has previously been formed with its central aperture and embossed at 24 and 25 has the tongues 6 and 7 bent back to locate the "bridges" 20 and 21.

The assembly is then inserted into a plastics sheath 26 (FIG. 4) to form a crimping clip. The clips may be inserted end-to-end into a long plastics sheath, in which case the sheath is apertured to coincide with the aperture 5, so that a feeding device can be used to feed the clip in a suitable crimping machine (for example the machine described in British Patent Specification No. 1,176,362 — Application No. 13600/67).

The centre part of the clip is illustrated in FIGS. 5 and 6. The base 2 of the outer member 1 has an aperture 27 (which is barrel-shaped in plan) which is in place of the aperture 5, tongues 6 and 7 and lip 8. That part of the inner liner above the aperture 27, has a central hole 28, and four slits 29 radiating at 90° from the hole. This part of the inner liner also has tangs 18'. The adjacent side walls have tangs 16'. The slits 29 permit each of the tangs 18' independent flexural movement.

Alternatively, and as shown in FIG. 7, a rectangular hole 30 may be formed in the base 2 and the liner in place of the holes 27 and 28 and the slits 29.

Semi-circular cut-outs indicated at X and Y are formed in the base 2 and side walls 3 and 4 of the member 1 to permit a degree of flexing of the adjacent portions of the inner liner to reduce the likelihood of fracture of wires interconnected by the clip. The cut-outs are not essential in clips used to joint copper wires but are particularly advantageous in clips used to joint aluminium wires.

It will be appreciated that formation of the tangs in the thinner liner produces sharper edges than if they were formed in the thicker outer member and these are able to penetrate more readily the surface of wires jointed by the clip. In the case of aluminium wires, the oxide layer on the surface of the wire is penetrated and electrical connection made to non-oxidised aluminium. The points of the tangs remain embedded in the wire and thereby reduce considerably the possibility of subsequent oxidation of the aluminium at the points of connection.

The crimping clip described above may be crimped in the conventional manner or by using the machine described in British Patent Specification No. 1,176,362. During crimping the raised lips such as 8 are pushed flat and, on releasing of the crimping force, tend to assume their original positions and thereby spring load the adjacent tangs, in the base of the liner, on to the wires in the clip. To gain full advantage from this effect, tangs 19 may be located close to the raised lips.

It will be appreciated that the tongues 6 and 7 need not be bent upwardly to lie against the side walls 3, 4 of the outer member but can be left to lie in the plane of the base. In this case, the liner has similar tongues which overlie the tongues 6, 7. The tongues in the liner are pierced to form tangs and these, after crimping, are spring-loaded by the tongues 6 and 7, thereby maintaining better electrical contact.

Similar effects may be achieved by central longitudinal slits in the base 2 of the outer member extending from close to the portions 9, 10 to the adjacent end of the member and by slightly turning-up the edges of the slits.

The provision of the cut-out 28 and slits 29 described above with reference to FIG. 5 has a similar result in that the adjacent tangs 18' are spring-loaded after crimping. The aperture 30 described above in connection with FIG. 7 permits the adjacent central side wall tangs 16' to spring-load the wires into the aperture 30.

The spring-loading of the tangs thus produces an in-built force which is particularly useful when jointing wires of aluminium which tend to "creep" from points of stress. As the wires creep from stress points, the tangs tend to move so as to maintain effective electrical contact with the wire.

Figure 8:
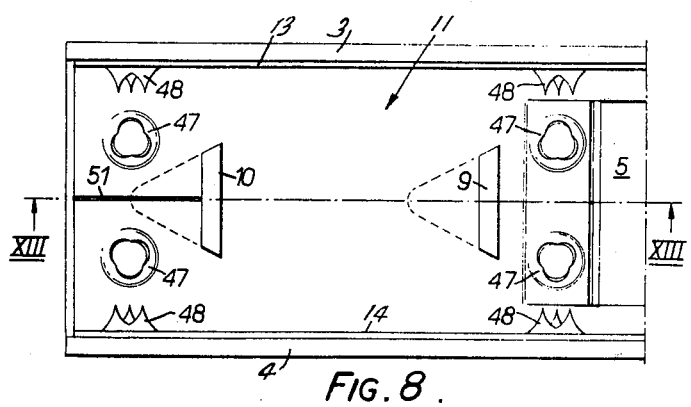
FIG. 8 is a plan view of a still further embodiment.
Figure 9:
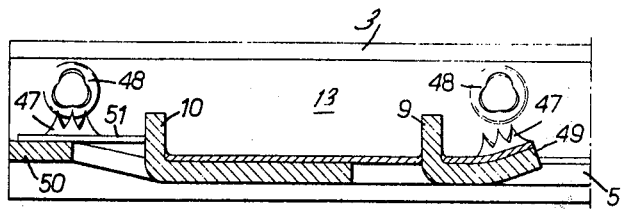
FIG. 9 is a cross-section along the line XIII—XIII of FIG. 8.

In an alternative form of the clip using a liner, as illustrated in FIGS. 8 and 9, there are provided eight tangs in each half of the liner (i.e. 16 tangs in all). Each half liner has four tangs 47 in the base which cooperate with two tangs 48 in each wall. Each of the tangs in the base of the liner is so located as to permit movement in a plane perpendicular to the plane of the base. The tangs 47 are located over a cantilevered lip 49 which is struck up at the side of the central aperture in the outer member of the clip 5. The two tangs in the base at the end thereof are located over raised portions 50 of the end of the base of the outer member, the liner being slit at 51 to permit the edges of the liner to locate in the clip.

Figure 10:
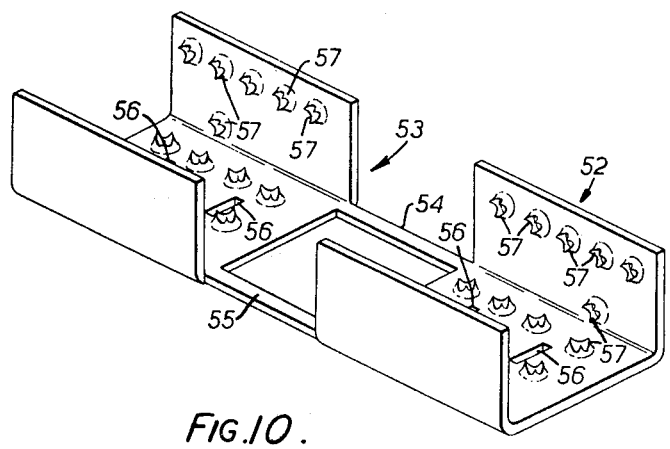
FIG. 10 is an isometric view of a liner.
Figure 11:
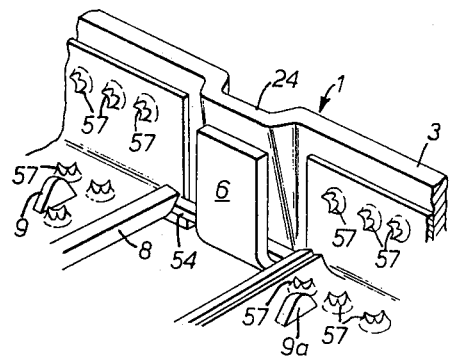
FIG. 11 is a scrap isometric view of a part of the liner of FIG. 10 in an outer member.

FIGS. 10 and 11 illustrate a liner suitable for use in the embodiments of FIGS. 1–7 and FIGS. 8–9 and its location in an outer member in greater detail. The two halves of the liner 52 and 53 are joined by a pair of bridges 54 and 55. Four slots 56 are pierced in the floor to engage the triangular portions of the trough-shaped member (which portion can be notched to enhance their hold properties) and the walls and floor are pierced with a series of tangs 57. When located in the trough-shaped member 1, the bridge 54 is held between the tongue 6 and the embossment 24. In addition, the portions 9, 9a also engage the liner to locate it.

Figure 12:
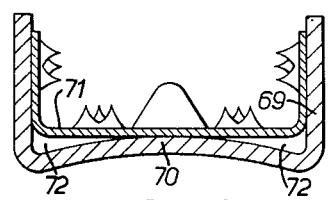
FIG. 12 is a cross-section of another form of the invention.
Figure 13:
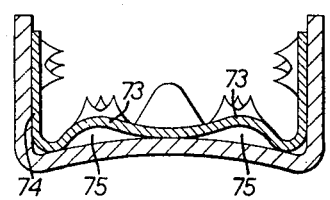
FIG. 13 is a cross-section of a further form of the invention.
Figure 14:
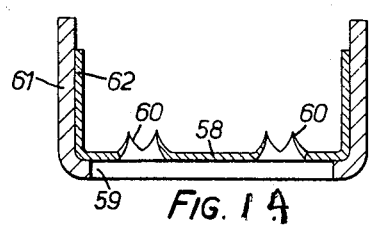
FIGS. 14–16 are cross-sections of yet another form of the invention in different stages of crimp.

FIGS. 12 to 14 illustrate three further forms of clips which include inner liners and which have been designed to enhance the holding power of the clip when crimped. The clip shown in FIG. 12, the outer member 69 has a central longitudinally-extending hump 70 which, together with a flat bottomed liner 71, forms two longitudinally extending air gaps 72 which act in the same manner as the aperture 59. Similarly, two humps 73 in the bottom of the liner 74 illustrated in FIG. 13 act to enhance the air gaps 75 which again act in a similar manner to the apertures 59. The clip shown in FIG. 12 has an outer member with a flat base with an elongated aperture 59 in it, the base 58 of the liner extending over the aperture.

Figure 15:
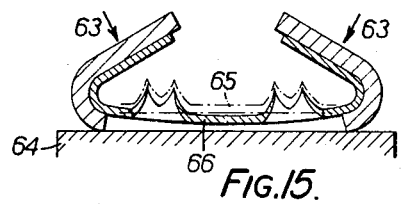
Figure 16:
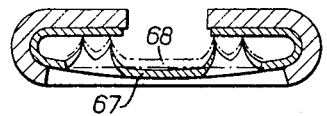

The operation of the forms of clip shown in FIGS. 12–14 is most easily understood with reference to FIGS. 14 to 16 which show three stages in the crimping of a clip. The important feature of this clip is the gap or gaps which exists below the liner. If a sheet of metal is bent to a given angle, it will tend to relax, i.e. move back against the direction of bending movement, when the pressure on the sheet is removed. This relaxation is in approximately inverse proportion to the cube of the thickness of the sheet, i.e. thin sheets relax a greater distance, but with less force, than thick ones.

In its initial, uncrimped, position, the clip is as shown in FIG. 14. The outer member and the liner are indicated at 61 and 62. For reasons of clarity, no tangs are shown in the walls of the inner liner, although these may be present, and no wires are illustrated in the drawings.

During crimping, force is applied to the outside of the walls 61 where indicated by the arrows 63 (FIG. 15), and the clip is supported at the base by an anvil 64. During crimping, the base 58 of the liner tends to be distorted into the gap or gaps beneath the liner as a result of the forces applied to the walls 62 of the liner through the outer wall 61 which act through the wires in the clip to force the base of the liner into the gap or gaps. The liner is displaced from its original position 65 indicated by the dotted lines to its new position 66. When the crimping force is removed (FIG. 16) the inner liner attempts to restore from the position 66 to the position 65. The outer member relaxes very much less and the net result is a residual elastic force acting on the tangs 60, which are engaging the wires. As has been explained above, this elastic force remains and the joint formed is enhanced as a result of this permanent in-built force. This in-built force is particularly useful when jointing wires of materials which tend to creep, for example aluminium. As the wires creep away from the points of stress, the tangs are moved upwards by the residual elastic force, thus maintaining effective contact with the wire.

We claim:

1. A crimping clip for electrically connecting together two or more electrical conductors comprising
   a. an open-ended, trough-shaped member having a base member and two upstanding wall members of equal height,
   b. at least two upstanding members located in longitudinal alignment with the confines of said base memeber whereby said base member is divided into longitudinal conductor receiving locations,
   c. a liner located within and in contact with the trough-shaped member, the liner having a base portion whose thickness is less than that of said base member,
   d. a plurality of upstanding tangs formed in the base portion of said liner, said tangs being of maximum wall thickness less than the thickness of said base member and being located within said conductor receiving locations, and
   e. a central opening in said base member of said trough-shaped member, edges to said opening lying transversely of the length of said clip, said edges being inclined towards the inside of said clip, tangs in the said base portion of said liner adjacent said transverse edges, and a central opening in said base portion of said liner coincident with said opening in said base member of said trough-shaped member.

2. A crimping clip for electrically connecting together two or more electrical conductors comprising
   a. an open-ended, trough-shaped member having a base member and two upstanding wall members of equal height,
   b. at least two upstanding members located in longitudinal alignment with the confines of said base member whereby said base member is divided into longitudinal conductor receiving locations,
   c. a liner located within and in contact with the trough-shaped member, the liner having a base portion whose thickness is less than that of said base member,
   d. a plurality of upstanding tangs formed in the base portion of said liner, said tangs being of maximum wall thickness less than the thickness of said base member and being located within said conductor receiving locations, and
   e. in said base member of said trough-shaped member, at least one aperture, and at least one tang in that part of said portion of said liner coincident with said aperture.

3. A crimping clip for electrically connecting together two or more electrical conductors comprising
   a. an open-ended, trough-shaped member having a base member and two upstanding wall members of equal height,
   b. at least two upstanding members located in longitudinal alignment with the confines of said base member whereby said base member is divided into longitudinal conductor receiving locations,
   c. a liner located within and in contact with the trough-shaped member, the liner having a base portion whose thickness is less than that of said base member,
   d. a plurality of upstanding tangs formed in the base portion of said liner, said tangs being of maximum wall thickness less than the thickness of said base member and being located within said conductor receiving locations, and
   e. in said base member of said trough-shaped member, at least one aperture, and at least one tang in that part of said base portion of said liner adjacent to said aperture, that part of said base portion coincident with said aperture in said base member of said trough-shaped member having an aperture lying approximately central of said aperture in said base member of said trough-shaped member, there being slits in said base portion of said liner extending away from said aperture therein.

4. A crimping clip for electrically connecting together two or more electrical conductors comprising in combination
   a. an open-ended, trough-shaped member having a base portion and two upstanding sidewalls of equal height,
   b. a liner of less thickness than the trough-shaped member, the liner being located within and contacting said trough-shaped member, the liner having a base portion and upstanding sidewalls,
   c. a plurality of slits in the base portion of said liner,
   d. a plurality of longitudinally-aligned upstanding projections formed integrally with said base portion of said trough-shaped member, which projections divide the confines of the clip into longitudinal conductor receiving locations and project through and securely engaged in said slits in said base portion of said liner to lock the base portions against relative movement, and,
   e. a plurality of inwardly extending tangs in parts of said liner bounding said locations.

5. A crimping clip as claimed in claim 4 wherein the base portion of said trough-shaped member has a central opening, and the base portion of said liner has a central opening coincident with the central opening of said trough-shaped member, said central opening of said trough-shaped member having edges lying transversely of the length of the clip and being inclined towards the inside of the clip, said base portion of said liner having portions lying adjacent said edges.

6. A crimping clip as claimed in claim 5 wherein said opening in said trough-shaped member also has edges lying longitudinally of the length of the clip and said trough-shaped member also having tongues extending upwardly from each of the longitudinal edges of the opening in said trough-shaped member with said tongues lying adjacent respective member walls, said liner having gaps in said upstanding walls accommodating said tongues.

7. A crimping clip as claimed in claim 4 wherein the base portion of said trough-shaped member has at least one aperture and in which said liner has a part overlying said aperture with at least one tang in said part overlying said aperture.

8. A crimping clip as claimed in claim 4 in which one of said base portions is plane and said other base portion is convoluted forming a series of gaps between said base portion of said trough-shaped member and parts of the base portion of said liner having tangs therein.

9. A crimping clip as claimed in claim 4 and further comprising, at least at one end of the clip, apertures in the sidewalls of said trough-shaped member permitting flexure of adjacent portions of said sidewalls of said liner.

10. A crimping clip as claimed in claim 4 and further comprising, at least of one end of the clip, apertures in the trough-shaped member base portion permitting flexure of adjacent portions of the base portion of said liner.

11. A crimping clip as claimed in claim 4 wherein said liner has its length and the height of its upstanding walls less than those of the trough-shaped member whereby the edges of said trough-shaped member form a margin extending beyond said liner.

* * * * *